(12) United States Patent
Cheng

(10) Patent No.: US 11,395,521 B2
(45) Date of Patent: Jul. 26, 2022

(54) HELMET WITH IN-MOULDED MEMORY FOAM MEMBER AND PROCESS THEREFOR

(71) Applicant: STRATEGIC SPORTS LIMITED, Pok Fu Lam (HK)

(72) Inventor: Tien Hou Cheng, Kowloon (HK)

(73) Assignee: STRATEGIC SPORTS LIMITED, Pok Fu Lam (HK)

( * ) Notice: Subject to any disclaimer, the term of this patent is extended or adjusted under 35 U.S.C. 154(b) by 921 days.

(21) Appl. No.: 14/374,226

(22) PCT Filed: Aug. 2, 2013

(86) PCT No.: PCT/CN2013/080677
§ 371 (c)(1),
(2) Date: Jul. 24, 2014

(87) PCT Pub. No.: WO2014/019537
PCT Pub. Date: Feb. 6, 2014

(65) Prior Publication Data
US 2015/0113709 A1 Apr. 30, 2015

(30) Foreign Application Priority Data
Aug. 2, 2012 (HK) .................................. 12107601.2

(51) Int. Cl.
*A42B 3/12* (2006.01)
*A42C 2/00* (2006.01)
*B29C 44/12* (2006.01)

(52) U.S. Cl.
CPC .............. *A42B 3/125* (2013.01); *A42C 2/002* (2013.01); *B29C 44/12* (2013.01)

(58) Field of Classification Search
CPC .......... A42B 3/125; A42C 2/002; B29C 44/12
See application file for complete search history.

(56) References Cited

U.S. PATENT DOCUMENTS 3,500,475 A * 3/1970 Otsuka ..................... A42B 3/16
2/421
3,629,882 A * 12/1971 Thorne .................. A41D 31/02
297/216.1
(Continued)

FOREIGN PATENT DOCUMENTS

CN 102370285 A 3/2012
GB 2021470 A 12/1979
(Continued)

OTHER PUBLICATIONS

Machine translation of KR20090072172.*

*Primary Examiner* — Khaled Annis
(74) *Attorney, Agent, or Firm* — Daniel F. Nesbitt; Nesbitt IP LLC

(57) ABSTRACT

A helmet has a memory foam member and an impact dissipating member in moulded together. A process for forming such a helmet is also provided. A helmet has a memory foam member and an impact-dissipating member. The memory foam member is formed from a memory foam material and the impact-dissipating member is formed from an impact-dissipating material and has an impact-dissipating member inner side and an impact-dissipating member outer side opposite the impact-dissipating member inner side. The memory foam member is in-moulded with the impact-dissipating member. Also, a process for forming a helmet by in-moulding a memory foam member and an impact-dissipating material together. The in-moulding process permanently binds the memory foam member outer side to the impact-dissipating member inner side.

20 Claims, 1 Drawing Sheet

(56) References Cited

U.S. PATENT DOCUMENTS

| | | | | |
|---|---|---|---|---|
| 3,764,250 A * | 10/1973 | Waterloo | ................ | B29C 49/36 |
| | | | | 264/543 |
| 3,994,022 A * | 11/1976 | Villari | .................... | A42B 3/121 |
| | | | | 2/413 |
| 5,565,155 A * | 10/1996 | Cheng-Hung | ......... | A42C 2/002 |
| | | | | 264/338 |
| 6,241,926 B1 * | 6/2001 | Cutler | .................... | A42C 2/002 |
| | | | | 264/113 |
| 2002/0120978 A1 | 9/2002 | Moore | | |
| 2007/0220662 A1 * | 9/2007 | Pierce | .................... | A42B 3/125 |
| | | | | 2/410 |
| 2008/0172774 A1 * | 7/2008 | Ytterborn | ................ | A42B 3/10 |
| | | | | 2/412 |
| 2008/0250546 A1 * | 10/2008 | Watabiki | ................ | A42B 3/227 |
| | | | | 2/411 |
| 2012/0005810 A1 | 1/2012 | Cheng | | |

FOREIGN PATENT DOCUMENTS

| | | |
|---|---|---|
| WO | 1996022710 A1 | 8/1996 |
| WO | 2007041656 | 2/2007 |

\* cited by examiner

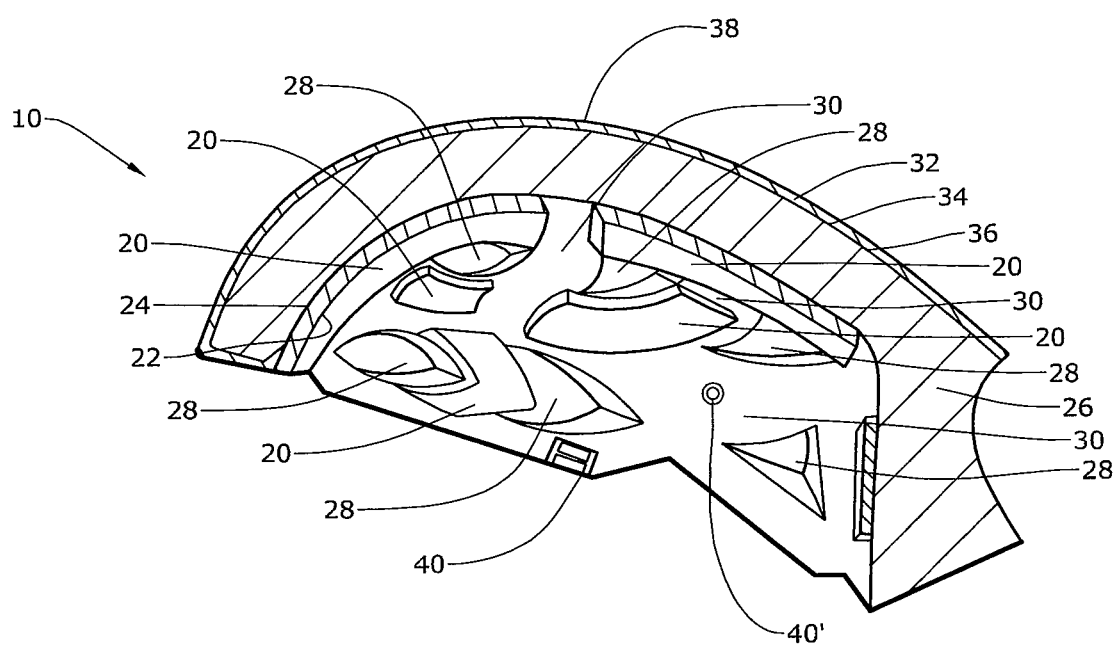

HELMET WITH IN-MOULDED MEMORY FOAM MEMBER AND PROCESS THEREFOR

FIELD OF THE INVENTION

The present invention relates to a helmet and a process for making a helmet. More specifically, the present invention relates to an in-moulded helmet and an in-moulding process for making a helmet.

BACKGROUND

Processes for making form-fitting protective gear, such as a helmet, are well known and typically involves the use of a hollow mould into which an expandable material, such as a foam and/or a foam precursor is added. The mould is typically heated up prior to or during the process, and often a vacuum is applied to help expand the foam and/or foam precursor.

In-moulding, also known as injection-moulding and co-injection moulding, is well-known in the art of helmet making for combining a hard outer shell with an inner polystyrene shape. Processes are known for adding a lac-quered outer shell to a styrofoam, polystyrene foam, or other foam helmet. Other processes are known for injecting a pre-mixture of, for example expandable poly styrene (EPS) beads and spongy particles into a mould together so as to allegedly produce a helmet with a balance between impact protection and impact absorption. In some cases expandable poly propylene (EPP) beads are used as well. Some processes apply different materials into the mould at the same time, while other processes first form the pieces separately and then affix them together afterwards. In many cases an adhesive is used to affix such separately formed pieces together. In some cases the pieces are formed separately with flexible and/or complementary shapes so that they either snap together or otherwise affix to each other without the need for an adhesive.

In the helmet art, the artisan often seeks to maximize impact protection for the head in, for use in sports such as American Football, cycling, motorcycling, horse riding, skating, baseball, boxing, skiing, car racing, etc. Other helmets may protect the wearer during, for example, combat, fire fighting, riots (riot helmets), construction, etc. While helmets are possible that protect the head very well, they may break quickly and thus only be suitable for a single or limited uses. Other helmets that are longer-lasting may be quite heavy, cumbersome, and/or may insufficiently absorb or inadequately dissipate an impact force.

While there have been many advances in materials for improving head and cranial protection, such helmets may often be heavy, uncomfortable, brittle, energy-intensive, and/or possess a poor fit. Such improvements may be either quantitative (i.e., measurable according to specific test methods), or qualitative and subjective. In cases of fit and comfort, these qualities are typically quite subjective, as different people have very different head shapes, sizes, and even very personal concepts of what is comfortable and a "good fit". In some helmet-forming processes, the padding and other pieces are added separately by hand, which makes the manufacture of such helmets quite labour-intensive and the quality susceptible to human error. Thus, there is a continuing need for improved helmets and improved helmet-forming processes.

SUMMARY OF THE INVENTION

The present invention relates to a helmet having a memory foam member and an impact-dissipating member. The memory foam member is formed from a memory foam material and has a memory foam member inner side and a memory foam member outer side opposite the memory foam member inner side. The impact-dissipating member is formed from an impact-dissipating material and has an impact-dissipating member inner side and an impact-dissipating member outer side opposite the impact-dissipating member inner side. The memory foam member outer side is in-moulded with the impact-dissipating member inner side.

The present invention also relates to a process for forming a helmet by including the steps of providing a female mould portion, providing a male mould portion, providing a memory foam material and providing an impact-dissipating material. The female mould portion and the male mould portion are fit together to form a hollow mould therebetween. The memory foam material is applied to the male mould portion either as a memory foam member or as a memory foam material. If the memory foam member is not already formed by the memory foam material when being applied to the male mould portion, then the process further includes the step of forming the memory foam material into a memory foam member. The memory foam member and the impact-dissipating material are subject to an in-moulding process within the hollow mould. The memory foam member has a memory foam member inner side and a memory foam member outer side opposite the memory foam member inner side. The impact-dissipating material forms an impact dissipating member having an impact-dissipating member inner side and an impact-dissipating member outer side opposite the impact-dissipating member inner side. The in-moulding process permanently binds the memory foam member outer side to the impact-dissipating member inner side.

Without intending to be limited be theory, we believe that the above helmet and the helmet formed by the above process possess several significant advantages over other helmets ranging from, for example, greater comfort, better impact resistance, improved binding between the memory foam member and the impact-dissipating member, increased toughness, improved fit, the ability for a single helmet design to fit multiple head shapes, especially to fit multiple head shapes comfortably, durability of the memory foam member to impact-dissipating member bond, permanently binding the memory foam member to the impact-dissipating member, and others.

BRIEF DESCRIPTION OF THE DRAWINGS

FIG. 1 is a cut-away side view of an embodiment of a helmet according to the present invention.

The FIGURE herein is not necessarily drawn to scale.

DETAILED DESCRIPTION

Unless otherwise specifically provided, all tests are conducted at standard conditions which include a room and testing temperature of 25° C., and sea level (1 atm.) pressure. Unless otherwise specifically indicated, all measurements are made in metric units. Unless otherwise specifically indicated, all ratios and percentages are by weight. Unless otherwise specifically indicated, one skilled in the art understands that all chemical reagents, raw materials and compounds described herein are easily available from a variety of chemical vendors and suppliers worldwide.

Unless otherwise explicitly indicated, as used herein the terms "inner", "inside", and "internal" indicate a relative position towards the helmet portion which is or would be closer to the wearer's head. Unless otherwise explicitly indicated, as used herein the term "outer", "outside" and "external" indicate a relative position towards the helmet portion which is or would be closer to the outside of a helmet which is or would be away from the wearer's head.

The present invention relates to a helmet containing a memory foam formed from a memory foam member and an impact-dissipating member. The memory foam member is formed from a memory foam material and has a memory foam member inner side and a memory foam member outer side opposite of the memory foam member inner side. The impact-dissipating member has an impact-dissipating member inner side and an impact-dissipating member outer side opposite the impact-dissipating member inner side. The memory foam member outer side is in-moulded with the impact-dissipating member inner side.

The memory foam material, also sometimes known as a viscoelastic memory foam material, useful herein is a foam material which may be temporarily deformed under pressure and then which returns to its original shape and volume once the pressure is removed. Such memory foam materials are well known and may include a material selected from polyurethane, polyethylene, ethylene vinyl acetate, latex, rubber, and a combination thereof; or acrylic polyethylene, polyurethane, ethylene vinyl acetate and a combination thereof; or polyurethane, ethylene vinyl acetate and a combination thereof. In an embodiment herein the memory foam material contains a low resilience polyurethane material.

In order to be effectively in-moulded in the process herein, the memory foam material typically has a melting point from about 60° C. to about 250° C.; or from about 80° C. to about 180° C.; or from about 90° C. to about 160° C. Without intending to be limited by theory, it is believed that such a memory foam material temperature range balances desirable properties such as toughness, ability to permanently bond with the other helmet components, comfort, etc.

Memory foam material useful herein may be sold as the raw chemical and then foamed and/or formed according to the process herein, or may be purchased from numerous vendors around the world in a variety of forms, such as pre-formed sheets, inserts and/or pieces. However, for the ease of manufacturing, in an embodiment herein the memory foam material is purchased as a raw material and formed into a memory foam member during the in-moulding process.

The rigidness of a memory foam member made from a memory foam material is typically measured using the indentation force deflection (IFD). The indentation force deflection @25% compression rating (25% IFD) is an industry-standard method of measuring the "give" or "compression" of a foam, especially a polyurethane foam according to ASTM D3574-11, test $B_1$ described in sections 16-22. The indentation deflection force is defined as the Newtons (N) of force required to indent a flat circular indenter foot 200+3/−0 mm in diameter into a selected foam specimen to 25% of the specimen's total thickness. For example, if the memory foam is 10 centimeters thick, then the 25% IFD (sometimes also known as "IFD @25%") measures the force needed to press the indentor foot into the memory foam 2.5 cm (i.e., so that the relevant portion of the memory foam is compressed from 10 cm to 7.5 cm thick). IFD should always be specified as a number of Newtons (N) at a specific deflection percentage on a specific height foam sample, e.g., 25% IFD at "X" N/"Y" square centimeters×10 centimeters thick. One skilled in the art understands that different IFD values will be obtained if a different percentage deflection is used or if the height of the test specimen is different. It is also necessary to report the entire sample size, especially the surface area. Sample size (especially surface area), in addition to thickness, can drastically influence IFD readings. Unless otherwise stated the standard sample size used to measure the 25% IFD herein is 51 cm×51 cm×10 cm which equals a square-shaped foam block that is 2601 square centimeters×10 cm thick. One skilled in the art understands that memory foams and polyurethane foams are manufactured by multiple makers and in a wide range of IFDs. The memory foam member herein typically has a 25% IFD of from about 44 N/2601 square centimetres×10 cm thick to about 88 N/2601 square centimetres×10 cm thick; or from about 50 N/2601 square centimetres×10 cm thick to about 80 N/2601 square centimetres×10 cm thick; or from about 55 N/2601 square centimetres×10 cm thick to about 75 N/2601 square centimetres×10 cm thick. Without intending to be limited by theory, it is believed that memory foam materials with this level of 25% IFD provide sufficient comfort and fit to the wearer's head, while also absorbing impacts and keeping the head snug in the helmet. Without intending to be limited be theory, we believe that such a memory foam material as described above also allows sufficient comfort and fit so that a single helmet may fit multiple head shapes.

Sometimes, the memory foam is categorized by density instead of @25% IFD. In an embodiment herein the density of the memory foam member is from about 20 grams/litre to about 70 g/litre; or from about 25 grams/litre to about 65 grams/litre; or from about 30 g/litre to about 55 grams/litre. Without intending to be limited by theory, it is believed that such a range provides a good balance between being soft enough to provide acceptable comfort, while being rigid enough to be resilient and to reduce tearing and damage.

In an embodiment herein, the hardness of the memory foam material and/or the memory foam member; or the memory foam member; is measured using a sclerometer/durometer such as the TecLock hardness tester GS-701N. This is a spring hardness testing machine having a hemispherical push needle with a diameter of 5.08+/−0.02 mm (see FIG. 1 of JIS S 6050:2002, section 6.2. The hardness measurement below is accordingly measured according to JIS S 6050:2002, specifically section 6.2, except as otherwise noted herein. To measure the hardness of the memory foam, a piece of memory foam of the desired thickness is placed upon a hard, flat surface. The memory foam size must be larger than the hemispherical push needle, typically a square at least 25 mm on each size, although other shapes are also possible. The hardness tester is positioned so that the push needle is above the memory foam, and the entire hardness tester is depressed until the base of the hardness tester is touching the surface of the memory foam. The scale on the hardness tester is read and recorded. Typically this will be conducted 3 times with the memory foam sample and the scale readings averaged.

TABLE I

| | Relation between scale and force of spring | | | | | | | | | | | | |
|---|---|---|---|---|---|---|---|---|---|---|---|---|---|
| Scale | 0 | 10 | 20 | 25 | 30 | 40 | 50 | 60 | 70 | 75 | 80 | 90 | 100 |
| Force of Spring N | 0.54 | 1.32 | 2.11 | 2.50 | 2.89 | 3.68 | 4.46 | 5.25 | 6.03 | 6.42 | 6.82 | 7.60 | 8.39 |

According to the scale as shown in Table 2 of JIS S 6050:2002 (reproduced above as Table I), the memory foam herein has a measurement of from about 5 to about 75; or from about 10 to about 70; or from about 20 to about 60; or from about 25 to about 40; which corresponds to a force of spring of about 0.9 N to about 6.4 N; or from about 1.3 N to about 6 N; or about 2.1 N to about 5.3 N; or from about 2.5 N to about 3.7 N. For reference and without intending to be limited by theory, if it is believed that according to Table 2 of JIS S 6050:2002, the equation X=0.78 Y+0.54 satisfies the described table points where X=the force in Newtons, and Y=the scale number as shown in Table 2 of JIS S 6050:2002.

In an embodiment herein at least a portion of; or the average thickness of, the memory foam member is from about 0.5 mm to about 5 cm thick; or from about 1 mm to about 2.5 cm thick; or from about 1.5 mm to about 1 cm thick; or from about 2 mm to about 8 mm, as measured when the memory foam member is in a relaxed (i.e., noncompressed) state. When measuring the thickness of the memory foam member, it is important to realize that as the memory foam member and the impact-dissipating member are permanently bound together (see below), there is actual intermingling of the impact-dissipating material and the memory foam material at the interface. Therefore, it is important to measure the thickness of the memory foam material from the point in the subsurface of the impact-dissipating member where the memory foam material starts mixing with the impact-dissipating material, to the memory foam member inner side. Such a measurement may be made by, for example, cutting a finished helmet in half and measuring the memory foam member. In many cases, the impact-dissipating material and the memory foam material may be different colours, and thus such a measurement may easily be conducted by first cutting the helmet in a radial direction. In some cases, the memory foam member and the impact-dissipating member may be significantly intermingled together, such that, for example, half or more of the thickness of the memory foam member is within the impact-dissipating member in, for example, the subsurface of the impact-dissipating member inner side.

Traditionally, memory foam materials have been used to form mattresses, chair seats, pillows, and other materials which need to both deform under pressure and thereby adjust to, for example, parts of the human body well as return to their original shape and configuration. It is even known to add these to the inner surface of helmets by employing an adhesive, such as a glue or contact cement. However, the inventors found that over time the adhesives used to attach memory foam members to the inside of a helmet suffer from significant technical deficiencies, such as, for example, hardening and even crystallizing over time, peeling and/or separation from one or more surfaces, etc. so that the memory foam members may become dislocated, hardened, etc. which leads them to become unusable, or uncomfortable Thus the Applicant believes that the present helmet and helmets made by the process herein may provide significantly improved bonding, and/or durability of the memory foam member to impact-dissipating member bond.

In contrast, the present invention avoids such problems by carefully selecting the impact-dissipating material and the memory foam material such that when they are in-moulded together inside of the mould, the in-moulding process permanently binds the memory foam member outer side with the impact-dissipating member inner side. As used herein the term "permanently binds" (and its related term "permanently bound") indicates that the memory foam member is melted together with the impact-dissipating member in the in-moulding process so that the memory foam material and the impact-dissipating material actually intermingle at a molecular level. Thus, the memory foam member does not peel away or separate therefrom during normal use. Such a normal use does not include where, for example, someone deliberately cuts away the memory foam member with a knife, or other instrument. In such a permanently bound situation, the removal of the memory foam member would typically impair or even destroy the functionality of the memory foam member, the impact-dissipating member, and/or the helmet itself. Without intending to be limited by theory it is also believed that the present helmets and helmets made by the process herein may be significantly more comfortable, possess better fit, and/or provide improved long-term protection that previous helmets.

Thus in an embodiment herein the memory foam material has a melting point which is less than or equal to the impact-dissipating material melting point; or from about 0° C. to about 100° C. lower than the impact-dissipating material melting point. In an embodiment herein the memory foam material melting point is from about 0° C. to about 45° C.; or from about 5° C. to about 25° C. lower than the impact-dissipating material melting point. In an embodiment herein the memory foam material melting point is within about +/−15° C. of the impact-dissipating material melting point. Without intending to be limited by theory, it is believed that the above relationship between the melting points allows sufficient bonding of the memory foam material and the impact-dissipating material, without negatively impacting the production rate of the helmets. In some cases the memory foam material will be added to the mould as an already-formed memory foam member, while in other cases the memory foam material will be added, typically injected, into the hollow mould in an unfinished form (e.g., in the form of beads, a liquid, a paste, etc.), and the memory foam member will be formed within the hollow mould, prior to, or simultaneously with, the rest of the helmet.

In cases where the memory foam member is already formed prior to adding it to the hollow mould, the memory foam member will typically be added to (e.g., placed onto) the male mould member. When the melting temperatures have the above relationship, then when the impact-dissipating material is added into the hollow mould, the temperature of the impact-dissipating material would help melt at least the memory foam member outer surface so as to permanently bind it to the impact-dissipating member as the impact-dissipating member is being formed.

The impact-dissipating material is typically harder, or significantly harder than the memory foam material contains an impact-dissipating material. The impact-dissipating material useful herein is typically selected from a polystyrene, a polypropylene, and a mixture thereof; or from an extruded polystyrene, an expanded polystyrene; expanded polypropylene, and a mixture thereof; or an expanded polystyrene, and a mixture thereof. Without intending to be limited be theory, we believe that these materials provide a good balance between factors such as cost, weight, durability, impact-dissipation, formability, stability across various temperature ranges, etc. Expanded polystyrene especially tends to be light and also able to withstand both high and low temperature extremes and maintain its physical shock-absorbing properties for use in, for example, skiing helmets as well as water sport helmets.

In an embodiment herein, the invention contains a shell external to, typically permanently bonded to, the impact-dissipating member outer side. The shell typically covers most, if not all of the impact-dissipating member outer side. While typically quite thin, the shell does contain a shell inner side and a shell outer side opposite to the shell inner side. The shell inner side is typically also permanently bound to the impact-dissipating member outer side during the in-moulding process.

The shell serves multiple purposes such as aesthetics, additional impact dissipation, friction reduction, etc. For example, the shell may have various pigments, patterns, and/or textures thereupon or therein, including those recognizable as designs, logos, etc. In an embodiment herein, the shell is a hard, brittle material such as, for example, polycarbonate, which is intended to shatter upon impact so as to further dissipate the impact of a collision. In theory, such a shattering of the shell propagates the impact force in a lateral direction, so as to reduce the force transmitted through to the impact-dissipating material. The shattered shell after an impact may also be an indication that the impact was so great that structural integrity of the helmet may have been compromised, and therefore that the helmet should be replaced with a new helmet and/or repaired.

In an embodiment herein the shell contains a shell material selected from a polycarbonate, a polystyrene, a polyacrylate and a mixture thereof; or from an extruded polystyrene, an expanded polystyrene, and a mixture thereof; or an expanded polystyrene; and a mixture thereof.

In an embodiment herein, the shell contains a friction-reducing material selected from polytetraflouroethylene, perflouroalkoxy, fluorinated ethylene propylene, aluminium magnesium boride, nylon, acetal, ultra high molecular weight polyethylene, and a mixture thereof.

The process for making the helmets herein typically includes providing a female mould portion, providing a male mould portion, providing a memory foam material, and providing an impact-dissipating material. The female mould portion is complementary to the male mould portion and therefore the female mould portion and the male mould portion are able to be fit together so that they form a hollow mould therebetween. Either before the male mould portion and the female mould portions are fitted together, or after the male mould portion and the female mould portions are fitted together a memory foam material is provided and the memory foam material is applied to the male portion.

The memory foam material may be applied to the male mould portion either as a unformed shape, for example, as the memory foam material which may be in the form of beads, a liquid, a paste, etc., in which case the male mould portion would typically possess injection points specifically for the memory foam material; or the memory foam material may already be formed into a memory foam member and applied to the male mould portion.

If the memory foam member is not already formed by the memory foam material when it is applied to the male mould portion, then the process further includes the step of forming the memory foam member form the memory foam material, typically simultaneously with the forming of the impact-dissipating member form the impact-dissipating material. Either way, the memory foam material and the impact-dissipating material then are subjected to an in-moulding process within the hollow mould. Thus, at some point during the in-moulding process, the memory foam member has a memory foam member inner side and a memory foam outer side opposite the memory foam member inner side. In the case where the memory foam member is already formed and has a memory form member inner side and a memory foam outer side opposite the memory foam inner side, then the process skips the above memory foam member forming step and proceeds.

The impact-dissipating material is provided and this impact-dissipating material is applied into the hollow mould. The impact-dissipating material is typically applied in the form of a liquid or a plurality of beads; or as a plurality of beads.

In the process herein the impact dissipating material forms an impact-dissipating member having an impact-dissipating member inner side and an impact-dissipating member outer side opposite from the impact dissipating member inner side. The in-moulding process permanently binds the memory foam member outer side to the impact-dissipating member inner side. Additional other parts may be also formed into, onto, or by the various helmet components at this time, for example, a shell, an attachment area, a frame, a reflector, etc.

The in-moulding processes and machinery will typically conduct the in-moulding process at a temperature of from about 65° C. to about 250° C., or from about 80° C. to about 180° C., or from about 90° C. to about 160° C. Without intending to be limited by theory, it is generally believed that with lower temperatures the in-moulding process may suffer from problems such as not forming a strong bond between the memory foam member and the impact-dissipating member, may provide insufficient foaming/expansion, may require too long to form the helmet, etc. Conversely, with higher temperatures, the manufacturing and energy costs are high, the materials may not be able to withstand such heat, etc. For some specific impact-dissipating materials and/or memory foam materials; however, a higher temperature range may be desirable. To facilitate this process, in an embodiment herein the hollow mould; or the male mould potion, the female mould portion or both, contains a temperature control element to control the temperature; or to heat up, cool down, and/or maintain the temperature; within a specified range for one or more times during the in-moulding process. In an embodiment herein the temperature control element contains both a heating element and a cooling element to better control the in-moulding process.

In an embodiment herein the shell material is provided and applied to the female mould portion prior, typically prior to or during the in-moulding process. In this embodiment, the shell material forms a shell and the in-moulding process permanently binds the shell; or the shell inner side, to the impact-dissipating member outer side.

As the in-moulding process may be conducted under vacuum, in an embodiment herein the hollow mould is an airtight hollow mould, meaning that the hollow mould is sufficiently airtight to the point where an effective vacuum may be applied to, for example, expand the memory foam material, expand the impact-dissipating material, or both. Such a hollow mould may still include one or more injection points where, for example, the memory foam material, expand the impact-dissipating material, the shell material, and/or all of these materials are injected. In an embodiment herein the hollow mould is provided where one or more of the memory foam material, expand the impact-dissipating material, and the shell material are injected therein. In an embodiment herein the male mould portion contains an injection point therein; or a plurality of injection points.

The hollow mould may further contain additional positions to provide one or more additional features for the helmet. Such an additional feature may be, for example, a buckle, a clip, an attachment area, a frame, a reflector, or a combination thereof. Such an additional feature may be in one or more different locations in the helmet, on the helmet, or both. In an embodiment herein, the helmet comprises a reflector, either added afterwards, or in-moulded therein. Such a reflector is typically on the outer most side of the helmet, typically the shell outer side, and may increase safety by, for example, reflecting light form a car during the night time. Such reflectors may be, for example, stickers, paints, pigments, plastic pieces, etc. as are well-known known in the art.

Turning to the Figures, FIG. 1 is a cut-away side view of an embodiment of a helmet, 10, according to the present invention. The helmet, 10, has a memory foam member, 20, which has a memory foam member inner side, 22, and a memory foam member outer side, 24. The memory foam member outer side, 24, is opposite (i.e., on the opposite side of) the memory foam member inner side, 22.

The helmet, 10, also contains an impact-dissipating member, 26, formed of an impact dissipating material. The helmet, 10, contains a hole, 28, which allows air to flow through the helmet, 10, when it is worn. The helmet, 10, will often contain a plurality of holes, 28, which also lower the weight of the helmet and reduce the amount of raw materials used and production costs. Multiple ribs, 30, run between and bound the holes, 28, and these are made from the impact-dissipating material. The ribs, 30, therefore form the structural basis for impact-dissipating member, 26, of the helmet, 10. Multiple memory foam members, 20, are found in the interior of the helmet, 10, each of them permanently bound to the impact-dissipating member, 26, oftentimes at the ribs, 30, in between the holes, 28.

The helmet, 30, also contains a shell, 32, external to the impact-dissipating member, 26 and covers much of the impact dissipating member, 26. The shell, 32, has a shell inner side, 36, is permanently bound to the impact-dissipating member outer side, 34. The shell outer side, 38 is open to the air and the farthest portion of the helmet from the wearer's head (not shown).

The helmet, 10, has an additional feature, 40, also in-moulded to the impact-dissipating member, 26. In this case the additional feature is a buckle for attaching, for example, a chin strap (not shown). The helmet, 10, also contains another additional feature, 40', which in this case is a threaded hole for a screw which may be used to attach, for example, an insert for wearers with smaller-sized heads, etc.

Example I

In a compression test, a Comparative Example A test material was made with EPS but without the memory foam material and a corresponding Example I test material was made with EPS and a 4 mm memory foam material layer are formed. The total thickness of each sample is 30 mm prior to testing. A standard impact test is conducted whereby the sample is dropped from 3.25 m at a rate of 7.75 m/s, and then dropped again from 2.45 m at a rate of 6.75 m/s. After the impact test, the Comparative Example A showed distinctly visually-observable compression and cracks in the EPS around the impact area. In contrast, the Example I showed no cracking in the memory foam, nor any visually-observable compression.

Furthermore, the samples were cut in half and their thicknesses at the impact point carefully measured. The after-impact thickness of Comparative Example A was 22.90 mm {equalling [1−(22.90/30)]*100=23.7% compression}, whereas the after-impact thickness of Example I was 24.28 mm {equalling [1−(24.28/30)]*100=19.07% compression} which shows that the memory foam absorbed some impact and also rebounded quickly. Example A was also more comfortable than Comparative Example A, when placed on the head.

Example II

The memory foam member in-moulded with the impact-dissipating member also performed well at a variety of different temperature conditions, and with a variety of different materials. A 4 mm layer of memory foam having a scale measurement of 40 (according to JIS S 6050:2002) is in-moulded with a standard EPS impact-dissipating member (formed into a test sample) to form Example IIA. Comparative Example IIA represents a standard helmet and is formed of only the standard EPS impact-dissipating member formed into a test sample. Side-by-side testing using a standard G-force measurement upon impact, for example, as per the testing method of Example I, showed that Example IIA has a significantly reduced mean transmitted G-force as compared to Comparative Example IIA. Specifically, Example IIA transmitted 15.26% less force at ambient temperatures, 14.68% less force when tested at warmer temperatures (i.e., the samples were heated immediately before testing), and 17.4% less force at colder temperatures (i.e., the samples were cooled immediately before testing). This means that Example IIA absorbed significantly more force than Comparative Example IIA, and that a helmet made according to Example IIA would transmit less of that force to a user's head during an impact.

Example IIB is formed from a standard EPS impact-dissipating member which is in-moulded with a 4 mm layer of EVA (ethylene-vinyl acetate) having a scale measurement of 45 (according to JIS S 6050:2002) and formed into a test sample. Example IIA also performs better than Example IIB, by transmitting 7.13% less force at ambient temperatures, 4.49% less force when tested at warmer temperatures (i.e., the samples were heated immediately before testing), and 8.68% less force at colder temperatures (i.e., the samples were cooled immediately before testing). This means that Example IIA absorbed significantly more force than Example IIB, and that a helmet made according to Example IIA would accordingly transmit less of that force to a user's head during an impact. However, Example IIB still performed significantly better than Comparative Example IIA.

Example IIC is formed from a standard EPS impact-dissipating member which is in-moulded with a 4 mm layer of APE (a low-density polyethylene and ethylene-vinyl acetate copolymer) having a scale measurement of 45 (according to JIS S 6050:2002) and formed into a test sample.

Example IIA also performs better than Example IIC, by transmitting 16.65% less force at ambient temperatures, 4.13% less force when tested at warmer temperatures (i.e., the samples were heated immediately before testing), and 5.12% less force at colder temperatures (i.e., the samples were cooled immediately before testing). This means that Example IIA absorbed significantly more force than Example IIC, and that a helmet made according to Example IIA would accordingly transmit less of that force to a user's head during an impact. However, Example IIC still performed significantly better than Comparative Example IIA.

Example IID is formed from a standard EPS impact-dissipating member which is in-moulded with a 3 mm layer of PORON® 15118 (a polyurethane foam available from, for example, Rogers Corporation, Shanghai China) having a scale measurement of 45 (according to JIS S 6050:2002) and formed into a test sample. Example IIA also performs better than Example IID, by transmitting 5.17% less force at ambient temperatures, 7.19% less force when tested at warmer temperatures (i.e., the samples were heated immediately before testing), and 13.77% less force at colder temperatures (i.e., the samples were cooled immediately before testing). This means that Example IIA absorbed significantly more force than Example IID, and that a helmet made according to Example IIA would accordingly transmit less of that force to a user's head during an impact. However, Example IID still performed significantly better than Comparative Example IIA.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided for separately or in any suitable subcombination.

The invention claimed is:

1. A helmet comprising:
    a plurality of memory foam members formed from a memory foam material, wherein the memory foam members each comprise a memory foam member inner side and a memory foam member outer side opposite the memory foam member inner side; and
    an impact-dissipating member formed from an impact-dissipating member material, wherein the impact-dissipating member comprises a plurality of ribs and has holes boundaried by the plurality of ribs, an impact-dissipating member inner side and an impact-dissipating member outer side opposite the impact-dissipating member inner side;
    wherein the outer side of each of the plurality of memory foam members is in-moulded with the impact-dissipating member inner side;
    wherein one or more of the plurality of memory foam members is located on a rib of the plurality of ribs and between the holes, to enhance a property selected from the group consisting of fit, impact absorption, and a combination thereof; and
    wherein each of the memory foam members is permanently bonded to the impact-dissipating member inner side by intermingling the impact-dissipating member material and the memory foam material at a molecular level.

2. The helmet according to claim 1, wherein the memory foam material has a melting temperature of from about 60° C. to about 250° C.

3. The helmet according to claim 1, wherein the memory foam member has an indentation force deflection at 25% compression rating of from 44 N/2601 square centimetres× 10 cm thick to 88 N/2601 square centimetres×10 cm thick.

4. The helmet according to claim 1, wherein the memory foam material is selected from the group consisting of polyurethane, polyethylene, ethylene vinyl acetate, latex, rubber, and a combination thereof.

5. The helmet according to claim 1, wherein the impact-dissipating material is selected from the group consisting of a polystyrene, a polypropylene, and a mixture thereof.

6. The helmet according to claim 1, further comprising a shell external to the impact-dissipating member outer side.

7. The helmet according to claim 6, wherein the shell comprises a shell material selected from the group consisting of a polycarbonate, a polystyrene, a polyacrylate and a mixture thereof.

8. The helmet according to claim 1 wherein the memory foam material has a hardness of from 5 to 75 according to JIS S 6050:2002, section 6.2.

9. The helmet according to claim 8 wherein the memory foam member has a hardness of from 10 to 70 according to JIS S 6050:2002, section 6.2.

10. The helmet according to claim 1, wherein the impact dissipating member comprises a crown and a right side, and wherein the ribs are located at the crown and the right side, and wherein the memory foam members are located at the ribs located at the crown and the right side.

11. The helmet according to claim 1, wherein the impact dissipating member comprises a crown, a left side, and a right side, and wherein the ribs are located at the crown, the left side, and the right side, and wherein the memory foam members are located at the ribs located at the crown, the left side and the right side.

12. The helmet according to claim 1, wherein the plurality of memory foam members are distinct from one another.

13. A process for forming a helmet comprising the steps of:
    providing a female mould portion;
    providing a male mould portion complementary to the female mould portion wherein the female mould portion and the male mould portion are able to fit together to form a hollow mould therebetween;
    providing a memory foam material and applying the memory foam material to the male mould portion either as a memory foam member, or as a memory foam material; and
    providing an impact-dissipating material and applying the impact-dissipating material into the hollow mould;
    wherein if the plurality of memory foam members are not already formed by the memory foam material when being applied to the male mould portion, then the process further comprises the step of forming the memory foam material into the plurality of memory foam members;
    wherein the plurality of memory foam member and the impact-dissipating material are subject to an in-moulding process within the hollow mould;
    wherein each of the memory foam members comprises a memory foam member inner side and a memory foam member outer side opposite the memory foam member inner side;
    wherein the impact dissipating material forms an impact-dissipating member comprising an impact-dissipating member inner side and an impact dissipating member outer side opposite the impact dissipating member inner side;

wherein the impact-dissipating member comprises a plurality of ribs and has holes boundaried by the plurality of ribs;

wherein the in-moulding process permanently binds the outer side of each of the plurality of memory foam members to the impact-dissipating member inner side at a molecular level; and wherein one or more of the plurality of memory foam members is located on a rib of the plurality of ribs and between the holes, to enhance a property selected from the group consisting of fit, impact absorption, and a combination thereof.

14. The process for forming a helmet according to claim 13, wherein the hollow mould comprises a temperature control element.

15. The process for forming a helmet according to claim 13, further comprising the steps of:

providing a shell material and applying the shell material to the female mould portion;

wherein the shell material forms a shell and wherein the in-moulding process permanently binds the shell to the impact-dissipating member outer side.

16. The process for forming a helmet according to claim 13, wherein the memory foam material has a hardness of from 5 to 75 according to JIS S 6050:2002, section 6.2.

17. The process for forming a helmet according to claim 16, wherein the memory foam member has a hardness of from 10 to 70 according to JIS S 6050:2002, section 6.2.

18. A helmet comprising:

a plurality of memory foam members formed from a memory foam material, wherein each of the plurality of memory foam members comprises a memory foam member inner side and a memory foam member outer side opposite the memory foam member inner side; and an impact-dissipating member formed from an impact-dissipating member material, wherein the impact-dissipating member comprises a plurality of ribs and has holes boundaried by the plurality of ribs, an impact-dissipating member inner side and an impact-dissipating member outer side opposite the impact-dissipating member inner side, and wherein the outer side of each of the plurality of memory foam members is in-moulded with the impact-dissipating member inner side;

wherein the memory foam members are located on the plurality of ribs, and wherein the plurality of memory foam members are distinct from one another; and wherein each of the memory foam members is permanently bonded to the impact-dissipating member inner side by intermingling the impact-dissipating member material and the memory foam material at a molecular level.

19. The helmet according to claim 18, wherein one or more of the plurality of memory foam members is located on a rib of the plurality of ribs and between the holes.

20. The helmet according to claim 18, wherein the impact dissipating member comprises a crown and a right side, and wherein the ribs are located at the crown and the right side, and wherein the memory foam members are located at the ribs located at the crown and the right side.

* * * * *